Sept. 28, 1965 J. L. MYERS 3,208,328
SCREWS
Filed April 11, 1962
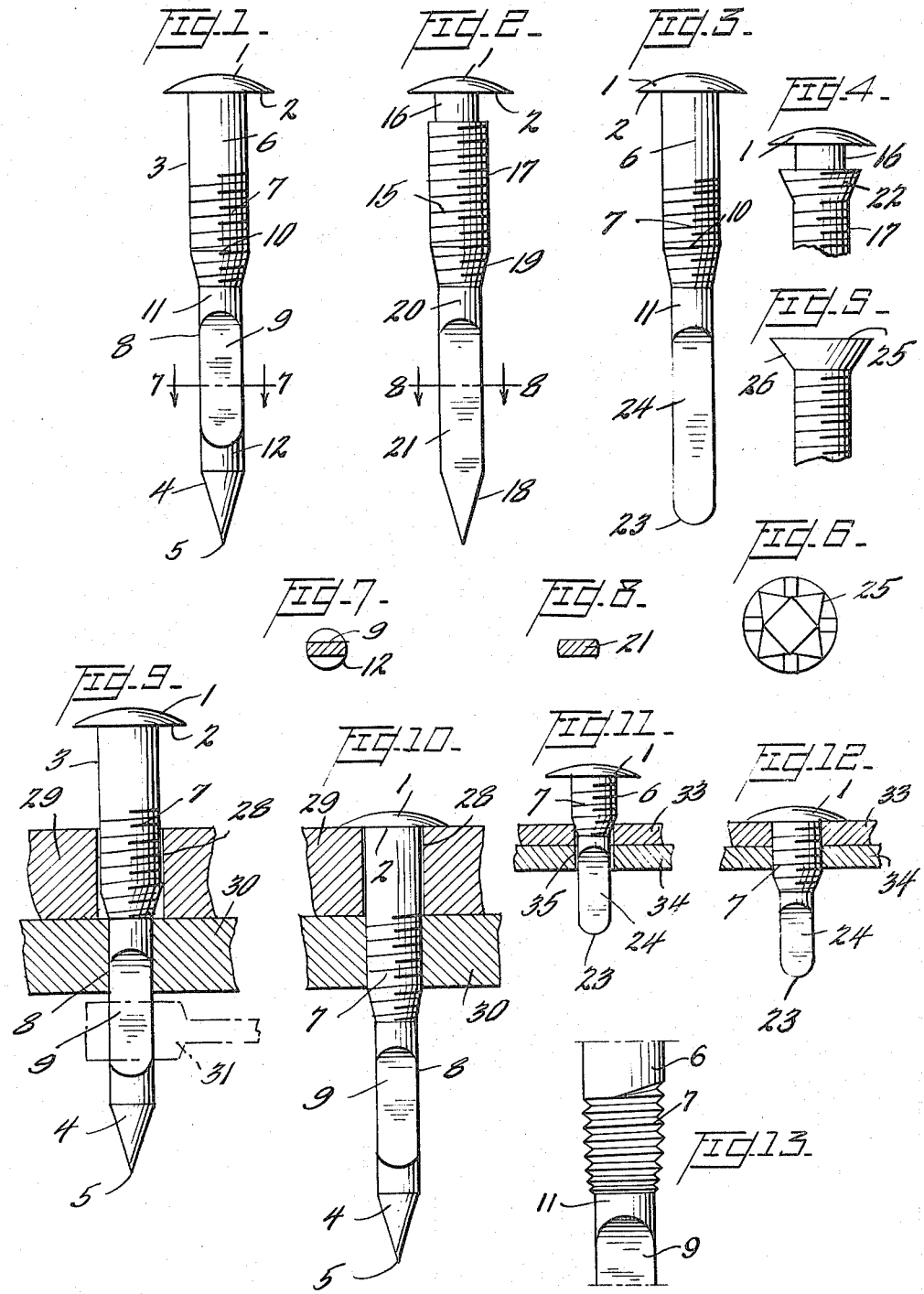

United States Patent Office 3,208,328
Patented Sept. 28, 1965

3,208,328
SCREWS
John L. Myers, 5001 Lafayette Ave., Omaha 32, Nebr.
Filed Apr. 11, 1962, Ser. No. 187,163
1 Claim. (Cl. 85—1)

The present invention relates to a screw useful in attaching or uniting parts, as of wood or metal or other materials. It has a particular use in places where it is difficult to apply a tool to the head of a screw to turn it or tighten it, and where the forward end of the screw is more readily accessible for such purposes. It is also useful where it is desirable to preserve smooth contours of exposed surfaces or where it is desired to render it difficult or impossible to remove a screw readily by ordinary means.

The screw of the present invention embodies means whereby it is positioned or advanced by applying a turning force to the shaft end instead of to the head end. For this purpose, the screw has a rigid, flattened, threadless portion between its tip and a screw-threaded portion of the shaft. The length of the flat portion is such that it protrudes from the stock through which it initially penetrates. The protruding flat portion is of such rigidity that it can be engaged by a wrench and the screw turned to advance the threaded portion of the shaft into and in the stock. No means are needed at the head for turning the screw.

Further details of the invention are set forth in the description hereinbelow with reference to the accompanying drawings.

In the drawing, FIGS. 1, 2 and 3 are side views of the screw of the present invention each with a different type of tip; FIGS. 4 and 5 are side views of fragments of the screw showing modified means adjacent the head end; FIG. 6 is a plan view of the top surface of a head of one form of screw; FIG. 7 is a cross section on line 7—7 of FIG. 1 in the direction of the arrows; FIG. 8 is a cross section on line 8—8 of FIG. 2 in the direction of the arrows; FIGS. 9 to 12, inclusive, illustrate the application of types of screws in fastening layers of materials together; and FIG. 13 diagrammatically illustrates details of structures in the screw shown in FIG. 1.

Similar numerals in the drawings designate similar features of the screws.

In FIG. 1, a screw having an enlarged, kerfless head 1 directly joined at its flat base 2 to a shaft 3, is shown with a threadless, conical, penetrating tip 4 having a sharp point 5 defining the forward-most portion of the screw. Arranged in succession from the head 1 to the tip 4, are a cylindrical portion 6 having a screw thread 7, and a threadless portion 8 at least a part 9 of which has flat, wrench-engaging areas.

The thread 7 may extend to or partly to the head 1. From an intermediate position 10, the portion 6 has an inwardly tapered portion at the forward end thereof having a continuation of the thread 7 thereon which gradually diminishes in the direction away from the head 1 to a threadless, smooth-surfaced, cylindrical portion 11 integral with the tapered end of portion 6. Between the flat part 9 and the tip 4 is another threadless, smooth-surfaced, cylindrical portion 12. These cylindrical portions are desirable for obtaining an initial channel in a stock for the threaded portion.

As illustrated by FIG. 13, the diameter of the cylindrical portions 11 and 12, and the width of the flat part 9 are preferably substantially equal to the diameter of the threaded portion 6 at the base or root of the thread 7, but less than the diameter at the crest of the thread on the above-mentioned tapered portion. In a screw in which the thread does not extend to the head 1, the diameter of the cylindrical, threadless part of the portion 6 adjacent the head 1 is preferably substantially that of the threaded part at the crest of the thread 7, or smaller.

In the screw shown in FIG. 2, the thread 15 extends to a position near the kerfless head 1. The small threadless portion 16 of the shaft adjacent the head makes possible easy turning of the screw when used for fastening metal sheets. The diameter of this portion 16 is slightly less than the diameter of the threaded portion 17 of the shaft at the crest of the thread 15, or preferably substantially equal to the diameter of the portion 17 at the root or base of the thread. The thread 15 diminishes in the direction toward the tip 18 of the screw along an intermediate part 19 of the shaft adjacent a threadless, cylindrical part 20. Between the tip 18 and the part 20, the shaft has a flattened portion 21 which extends to the point of the tip 18.

As illustrated in FIG. 4, the last several turns of the thread near the head of the screw shown in FIG. 2 may, if desired, have their crests 22 extend outwardly slightly beyond the crest of the thread on the main threaded portion 17. This is advantageous as a means for fastening light gauge metal sheets.

The structure of the screw shown in FIG. 3 is identical with that of the screw shown in FIG. 1 except that it has a blunt tip 23, and the portion 24 of the shaft from the cylindrical, threadless portion 11 to the end of the tip 23 is flat.

The head of the screw may be plain, with a flat surface 25, as shown in FIG. 5, or bevelled as at 26 for countersinking. This type of head may replace the spherical head on screws shown in the other figures. If desired, the surface 25 may be provided with a design, as shown in FIG. 6.

In the above-described screws, which may be of various sizes, the forward threadless portion is of predetermined length depending on the thickness of a stock or structure in which they are used. The said portion is of such length that when the tip is inserted in a predrilled hole in a stock, or when driven in a stock, the flattened portion of the shaft will pass through the stock and protrude sufficiently when the screw has reached the position where the thread begins to engage the stock, so that the protruding flat portion may be grasped with a tool, such as a wrench, whereby the screw, which may be right handed or left handed, is turned to advance it in the stock until the head is tightly drawn up.

FIGS. 9 and 10 illustrate the application of a screw of the type shown in FIG. 1, in the fastening together of layers of more readily penetrable materials, such as wood, plastics, etc. In FIG. 9, the shaft 3 of the screw is shown after it has been passed through a predrilled hole 28 in an upper layer 29, and after the conical tip 4 and the adjacent threadless portion of the shaft has been driven through a lower layer 30 to a position where the diminishing portion of the thread 7 begins to engage the side of the channel formed by the threadless portion 8 of the shaft 3 in the layer 30. In this position, the flattened portion 9 of the shaft 3 protrudes below the layer 30, and a wrench 31 is applied whereby the screw is turned to advance it to the position shown in FIG. 10 where the base 2 of the head 1 is drawn tightly against the upper surface of the layer 29.

The screw shown in FIG. 2 is applied somewhat in the same manner as the screw in FIG. 1. As indicated above, the screw shown in FIG. 2 is particularly useful in attaching light gauge metal sheets.

FIGS. 11 and 12 illustrate the application of a screw of the type shown in FIG. 3, in the fastening together of metal sheets. A hole is drilled through sheets 33 and 34. This hole 35 has a diameter less than the diameter of the screw-threaded portion 6 at the crest of the thread 7 but not less than the width of the threadless flat-sided portion 24. In FIG. 11, the screw is shown in a position where the portion 24 has been passed through both sheets 33 and 34 and protrudes from the lower layer where it is ready to be turned by means of a wrench. Upon turning, the thread 7 engages the side of the hole and is advanced therein through both sheets. In FIG. 12, the screw is shown in its final position where the head 1 is drawn up tightly against the surface of the upper sheet 33.

In the screws described, the thread may be a standard screw thread or bolt thread. When a bolt thread is used, a nut may be used on the protruding end of a threaded portion.

What is claimed is:

A screw comprising an enlarged head, a shaft including a cylindrical threaded portion and an inwardly tapered portion at the forward end thereof having a continuation of the thread thereon which diminishes in a direction away from the head, a first smooth-surfaced cylindrical portion extending from and integral with the tapered end of said shaft, a second smooth-surfaced cylindrical portion spaced from said first smooth-surfaced cylindrical portion and joined thereto by a portion having flat wrench-engaging areas, the diameters of said first and second cylindrical portions being substantially equal to the root diameter of the thread on the said shaft but less than the diameter at the crest of the thread on the said tapered portion, and a conical penetrating tip extending from said second cylindrical, smooth-surfaced portion to define the forward-most portion of the screw.

References Cited by the Examiner

UNITED STATES PATENTS

| 387,380 | 8/88 | Thayer | 85—30 |
| 595,775 | 12/97 | Herrin | 151—61 |
| 1,093,434 | 4/14 | Kent | 85—1 |
| 1,177,810 | 4/16 | Rogness | 85—46 |
| 2,263,424 | 11/41 | Langer | 85—47 |
| 2,320,286 | 5/43 | Lambert | 85—9 |
| 2,382,019 | 8/45 | Miller | 85—46 |
| 3,094,895 | 6/63 | Broberg | 85—47 |

FOREIGN PATENTS

| 499,980 | 12/50 | Belgium. |
| 1,885 | 8/58 | Great Britain. |
| 690,269 | 4/53 | Great Britain. |

CARL W. TOMLIN, *Primary Examiner.*

EDWARD C. ALLEN, *Examiner.*